(12) United States Patent
Guida

(10) Patent No.: US 10,239,606 B2
(45) Date of Patent: Mar. 26, 2019

(54) AIRFLOW INTERRUPTING DEVICES

(71) Applicant: Tamarack Aerospace Group, Inc., Sandpoint, ID (US)

(72) Inventor: Nicholas R. Guida, Sagle, ID (US)

(73) Assignee: Tamarack Aerospace Group, Inc., Sandpoint, ID (US)

( * ) Notice: Subject to any disclaimer, the term of this patent is extended or adjusted under 35 U.S.C. 154(b) by 0 days.

(21) Appl. No.: 14/097,159

(22) Filed: Dec. 4, 2013

(65) Prior Publication Data
US 2015/0151831 A1 Jun. 4, 2015

(51) Int. Cl.
*B64C 23/00* (2006.01)
*B64C 23/06* (2006.01)
*B64C 3/14* (2006.01)

(52) U.S. Cl.
CPC ...... *B64C 23/069* (2017.05); *B64C 2003/148* (2013.01); *Y02T 50/12* (2013.01); *Y02T 50/164* (2013.01)

(58) Field of Classification Search
CPC . B64C 2230/00; B64C 2230/26; B64C 21/00; B64C 21/10; B64C 23/00; B64C 23/04; B64C 23/06; B64C 23/065
See application file for complete search history.

(56) References Cited

U.S. PATENT DOCUMENTS

| 2,503,585 A * | 4/1950 | Loedding | B64C 23/00 244/113 |
| 2,740,596 A * | 4/1956 | Lee | B64C 23/00 244/130 |
| 3,430,898 A * | 3/1969 | Parechanian | B64C 3/00 244/117 R |
| 3,446,464 A * | 5/1969 | Donald | B64C 23/005 244/1 N |
| 4,334,658 A | 6/1982 | MacKenzie | |
| 4,702,441 A | 10/1987 | Wang | |

(Continued)

FOREIGN PATENT DOCUMENTS

| CA | 2513764 A1 * | 8/2004 | ............. B64C 3/38 |
| DE | 635568 C * | 9/1936 | ............. B64C 23/06 |

(Continued)

OTHER PUBLICATIONS

The Extended European Search Report dated Apr. 1, 2015 for European patent application No. 14196307.4, 9 pages.
The Australian Office Action dated Dec. 4, 2017 for Australian Patent Application No. 2014271302, a counterpart foreign application of U.S. Appl. No. 14/097,159, 4 pages.

(Continued)

*Primary Examiner* — Tien Q Dinh
*Assistant Examiner* — Aaron M Rodziwicz
(74) *Attorney, Agent, or Firm* — Lee & Hayes, P.C.

(57) ABSTRACT

A flow interrupting device may cause a flow to separate from a wingtip device at a desired angle of attack. The flow interrupting device may be coupled to a leading edge of a wingtip device where a flow disruptor may be configured to alleviate a load on the wingtip device. The flow disrupter may comprise an edge that extends into a boundary layer at a threshold angle of attack that may disrupt the boundary layer and cause a flow to separate from the wingtip device. This separated flow may reduce stresses experienced by the wingtip device and wing during various flight conditions where a transverse flow is encountered.

19 Claims, 11 Drawing Sheets

(56) References Cited

U.S. PATENT DOCUMENTS

| | | | | |
|---|---|---|---|---|
| 4,705,240 | A * | 11/1987 | Dixon | B64C 21/00 244/199.2 |
| 4,932,610 | A * | 6/1990 | Maestrello | B64C 21/00 114/67 A |
| 5,213,287 | A * | 5/1993 | Barron | B64C 3/14 244/130 |
| 7,275,722 | B2 * | 10/2007 | Irving | B64C 23/065 244/201 |
| 7,988,099 | B2 * | 8/2011 | Bray | B64C 5/08 244/199.1 |
| 2004/0155157 | A1 | 8/2004 | Bray | |
| 2006/0049307 | A1 | 3/2006 | Schweiger | |
| 2011/0008174 | A1 * | 1/2011 | Ireland | B64C 23/06 416/223 R |
| 2011/0024556 | A1 | 2/2011 | Cazals et al. | |
| 2014/0021302 | A1 * | 1/2014 | Gionta | B64C 21/00 244/200.1 |

FOREIGN PATENT DOCUMENTS

| | | | |
|---|---|---|---|
| DE | 19908223 | 8/2000 | |
| DE | 102005017825 A1 * | 10/2006 | ........... B64C 23/065 |
| EP | 2644497 A1 * | 10/2013 | ............. B64C 21/02 |
| JP | 4635536 | 10/1971 | |
| JP | 02293298 | 12/1990 | |
| NL | 38881 | 3/1936 | |
| WO | WO03000547 | 1/2003 | |
| WO | WO2004065209 | 8/2004 | |
| WO | WO 2014081355 A1 * | 5/2014 | ............... B64C 3/28 |

OTHER PUBLICATIONS

Japanese Office Action dated Oct. 23, 2018, for Japanese Patent Application No. 2014-245943, a counterpart foreign application for the U.S. Appl. No. 14/097,159.

* cited by examiner

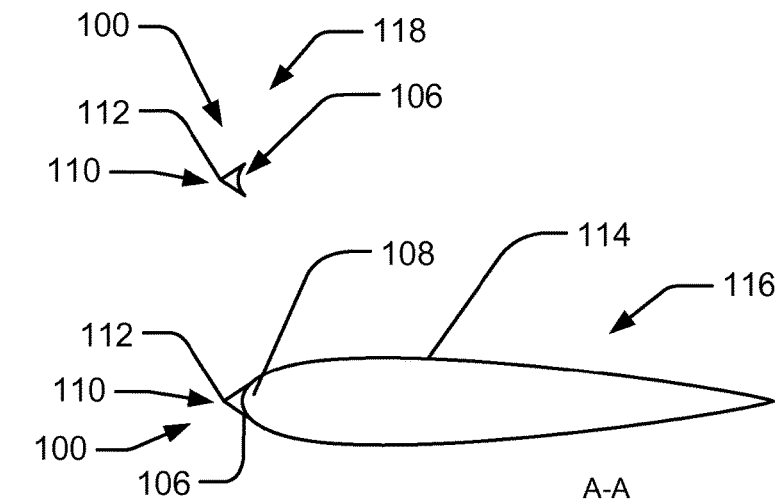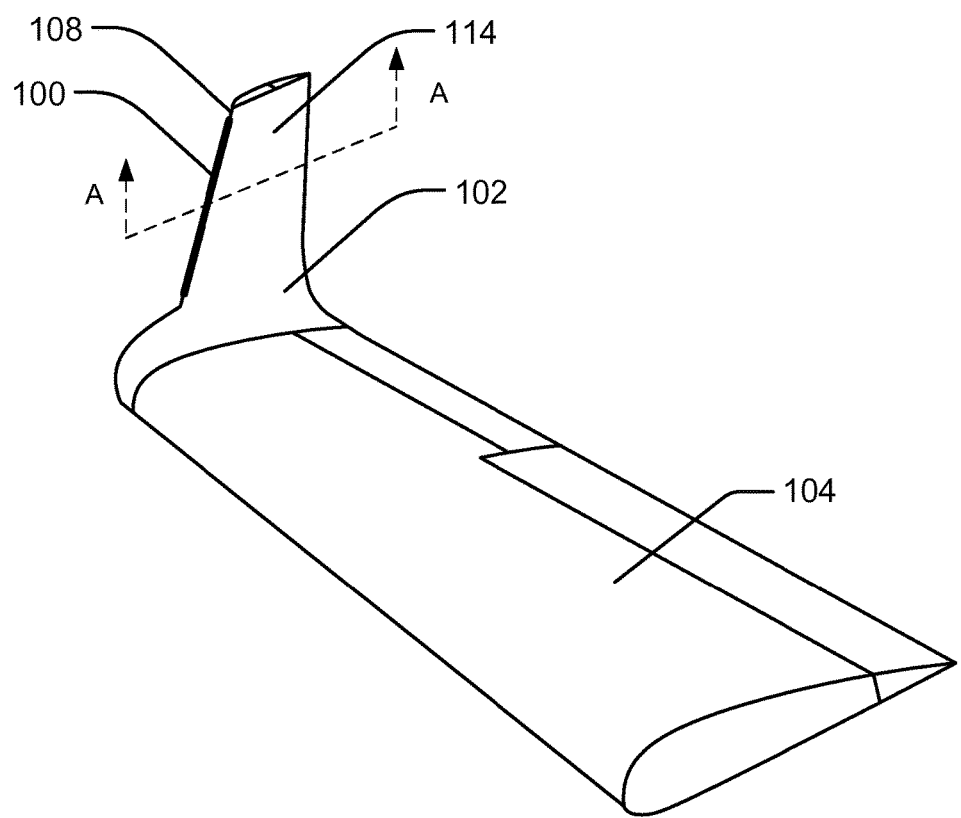
Fig. 1

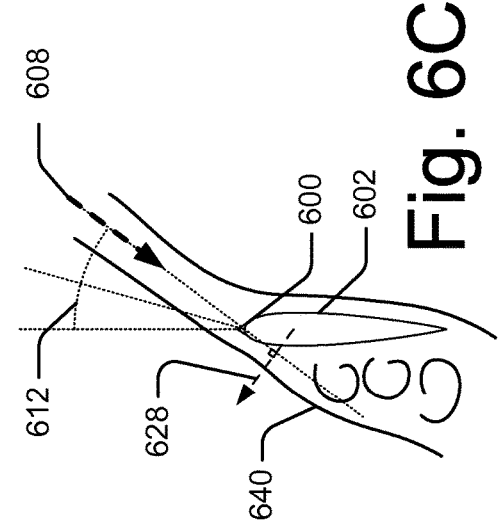
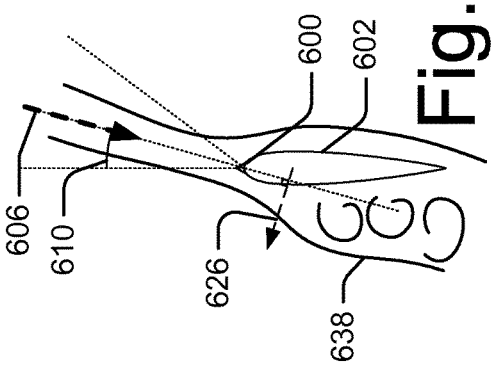
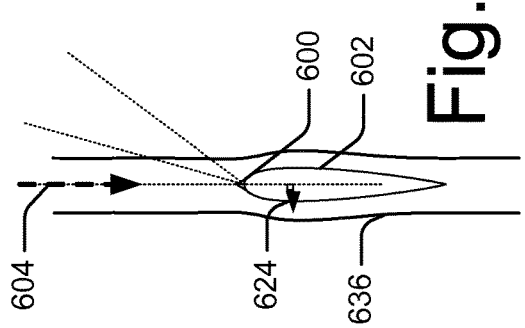
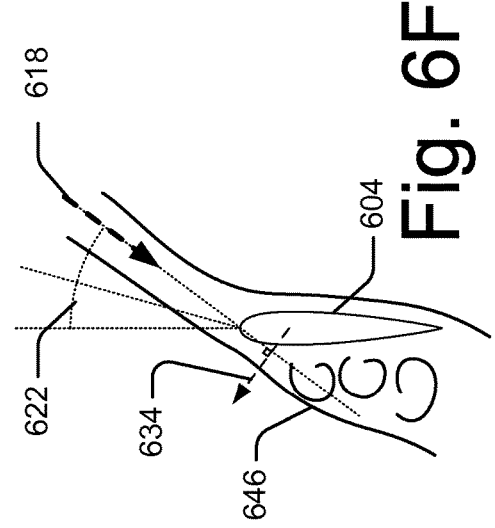
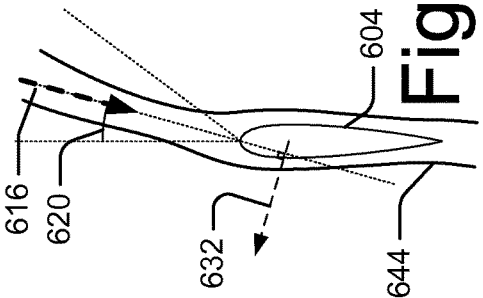
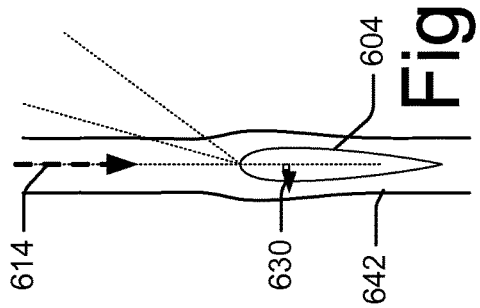

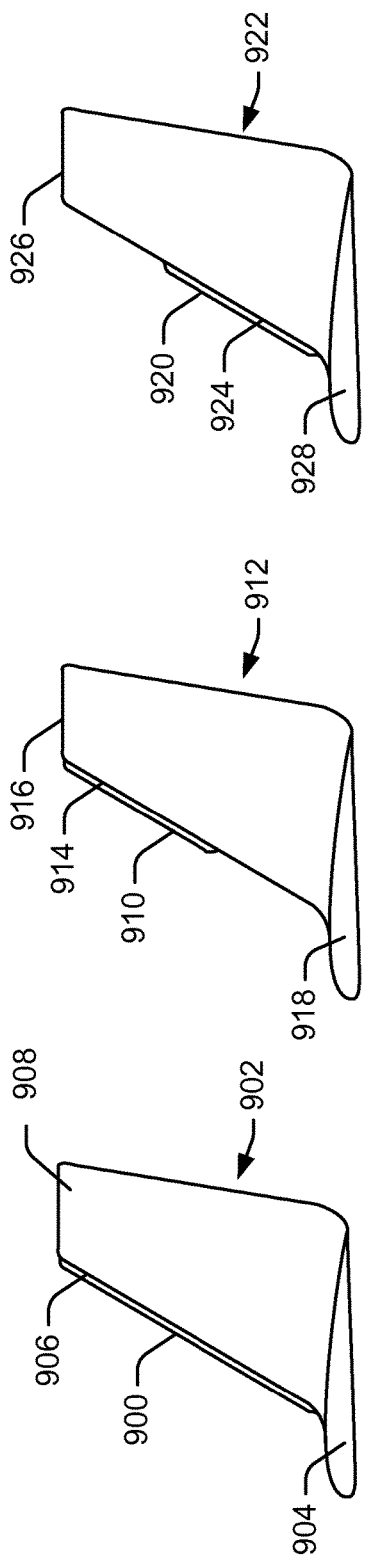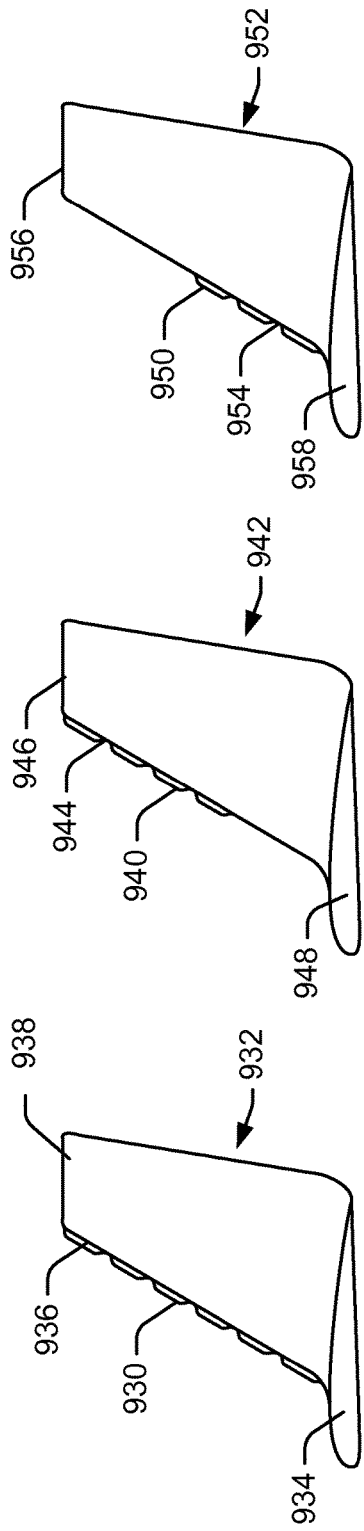

AIRFLOW INTERRUPTING DEVICES

BACKGROUND

There exists an ever growing need in the aviation industry to increase aircraft efficiencies and reduce the amount of fossil fuels consumed. Winglets have been designed and installed on many aircraft including large multi-passenger aircraft to increase efficiency, performance, and aesthetics. Such winglets usually consist of a horizontal body portion that may attach to the end of a wing and an angled portion that may extend vertically upward from the horizontal body portion. For example, a winglet may be attached to a pre-existing wing of an aircraft to increase flight efficiency, aircraft performance, or even to improve the aesthetics of the aircraft.

However, winglets must be designed for certain flight conditions that may represent extreme situations and/or edges of a design flight envelope. For example, an aircraft may encounter a gust from the side of the aircraft or engage in a maneuver, such as a side slip maneuver. These conditions may cause a transverse load to be applied to the winglet and the load may be transferred from the winglet to the wing. These additional loads are often accounted for and may require additional structure to safely handle the loads. This additional structure may add to the overall weight of the aircraft and detracts from any efficiencies gained by addition of the winglet in the first place. Accordingly, there remains a need in the art for improved aircraft winglets and wingtip devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes a flow interrupting device that may cause a flow to separate from a wingtip device at a desired angle of attack. For example, an aircraft may comprise a fuselage and a wing with a wingtip device. The flow interrupting device may comprise a first edge that may be coupleable to a leading edge of a wingtip device and a second edge comprising a flow disruptor configured to alleviate a load on the wingtip device.

Various embodiments contemplate that the flow disrupter may comprise an edge that extends into a boundary layer at a threshold angle of attack. Various embodiments contemplate that the edge extended into the boundary layer may disrupt (or interrupt) the boundary layer and cause a flow to separate from the wingtip device. This separated flow may reduce stresses experienced by the wingtip device and wing during various flight conditions where a transverse flow is encountered.

Various embodiments contemplate that the flow interrupting device may be located on a portion of the leading edge of the wingtip device that is substantially closer to an end of the wingtip device that is distal to a region of the wingtip device that is attachable to a wing. Additionally or alternatively, various embodiments contemplate that the flow interrupting device may be located on a portion of the leading edge that substantially spans the length of the leading edge.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 1 depicts an illustrative flow interrupter on a vertically extending wingtip device attachable to a wing of an aircraft.

FIGS. 6A-F depict cross-sectional views illustrative flow interrupters with wingtip devices in illustrative environments and flow representations.

FIGS. 9A-F depict illustrative flow interrupters in illustrative configurations on wingtip devices.

DETAILED DESCRIPTION

Overview

Figure 2:
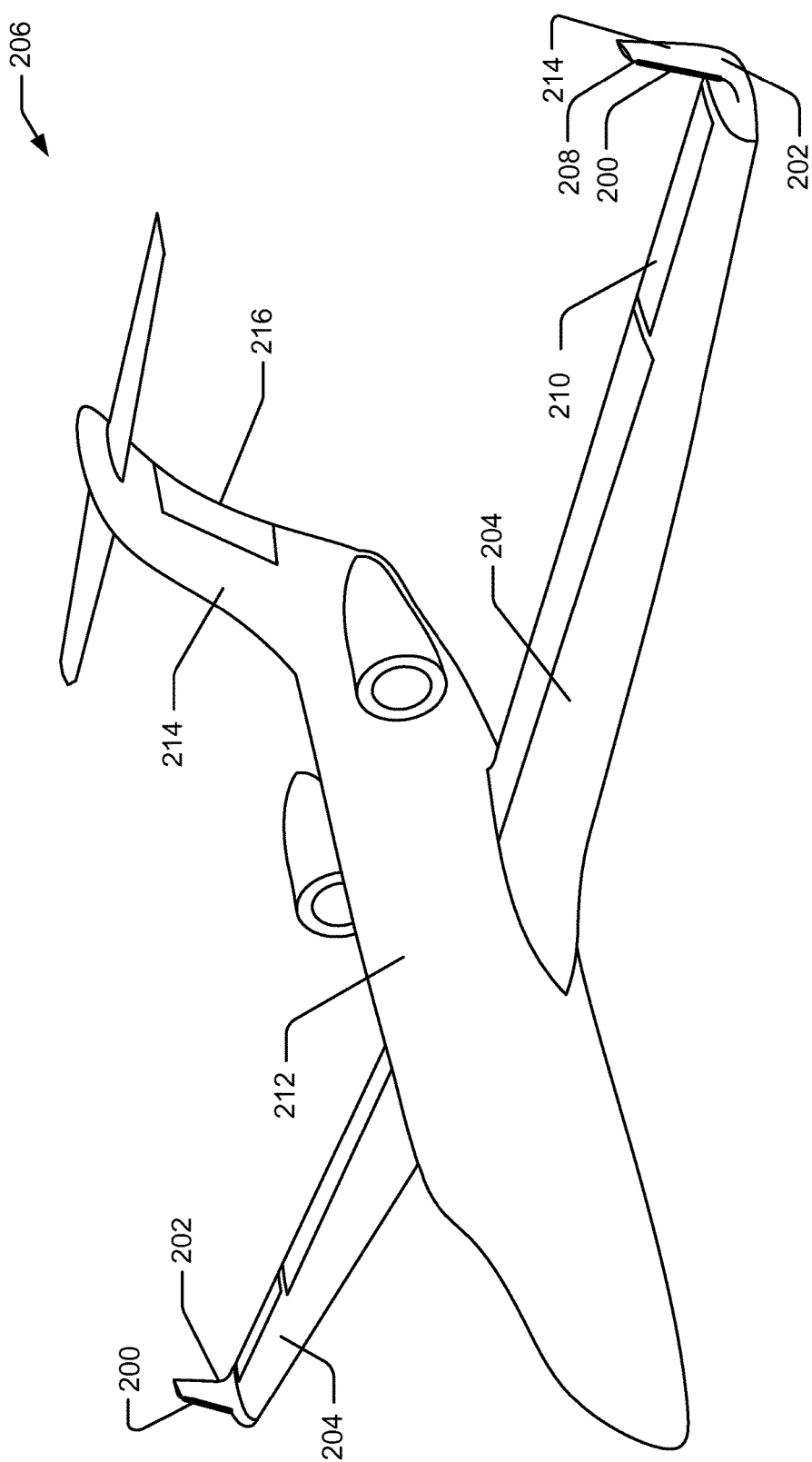
FIG. 2 depicts an aircraft with attached illustrative flow interrupters.

This application describes flow separating devices that may be used on wingtip devices to reduce forces caused by transverse loads to the wingtip devices. Reduction of these forces may reduce structural stress on the aircraft or drag losses caused by the transverse flow.

Aircraft are designed to handle both static and dynamic loads that the aircraft could experience along with a substantial factor of safety. For example, aircraft are generally designed to handle static loads such as a symmetric multiple-g maneuver, by way of a non-limiting example, a 2.5-g maneuver, a roll maneuver, or an abrupt rudder input that results in a sideslip maneuver, as well as dynamic loads such as loads caused by gusts or turbulence. Aircraft are also designed to avoid flutter induced loads.

Often, the aircraft wings are the limiting factors in designing the aircraft to handle the static and dynamic loads. The wing often has an inboard portion near the connection of the wing to the aircraft fuselage as well as an outboard portion near the wing tip. Often, each portion of the wing is designed to handle the highest loading each portion experiences. For example, the inboard portion of the wing often experiences the highest loading during a multiple-g maneuver, by way of a non-limiting example, a 2.5-g maneuver and is designed to handle the resulting load. Similarly, the highest loads on the mid- to outboard portions of the wing are often caused when speed brakes are extended. Often, the outboard tip of the wing is generally designed to handle roll maneuvers. However, when winglets are present, the highest loads on the outboard tip are usually caused by loads on the winglets during sideslip maneuvers or lateral gusts. As such, wingtips with winglets are designed to handle the loads caused by sideslip maneuvers or lateral gusts.

However, over the course of operation of an aircraft, sideslip maneuvers and lateral gust events are often limited in frequency and duration when compared to overall course of operation of the aircraft. However, the structural reinforcements and associated stress and mass required to handle these events are carried through the aircraft's operation even though this additional strength is used only in these relatively rare events. As such, it may be beneficial to trade some loss in wingtip device efficiency during these infrequent events for the relatively larger penalty of carrying the additional structure. For example, the wingtip device may operate as nominally designed over the bulk of an aircraft's operation, but effectively turn off a portion, or all, of the wingtip device's effects during these limited and infrequent events.

Often dynamic loads contribute to the maximum load of the outboard portion of the wing. For example, the response of the airframe to gusts or turbulence creates dynamic flight loads on the wing and winglet. During turbulence, the airframe may respond at different frequencies depending on its aerodynamics, inertia, and stiffness. Modifications to these parameters may change how the airframe responds to turbulence, which in turn changes the dynamic loads experienced by the wing. In addition to the winglet-induced increase in aerodynamic load, the weight of the winglet itself and its extreme outboard location on the wing also may increase the dynamic loads for the outboard wing. For example, the heavier the winglets are, the higher the dynamic loads the wing can experience.

Often the flutter characteristics of an airplane are evident at high speed when the combined structural and aerodynamic interaction may produce a destabilizing or divergent condition. Under such circumstances, an airplane with winglets is often sensitive to the weight and center of gravity (CG) of the winglets and associated structural wing changes. For example, additional weight near the wingtip, either higher than or aft of the wing structural neutral axis, may adversely affect flutter. As such, it may be desirable to reduce the weight near the wingtip and/or shift weight away from regions higher than or aft of the wing's neutral axis.

Various approaches may be used to address these design concerns including adding additional structure to the wing, adjusting the toe angle or relative angle of attack of the winglet to the flow at the wingtip, limiting the range of motion of speed brakes, among other techniques, and combinations thereof.

Wingtip devices may be designed or modified to reduce loads in various situations and/or at various flight conditions. For example, during a side slip maneuver, the flow across the winglet may include an additional transverse component of the flow. This transverse component of flow may cause an increase in the loads experienced by the winglet, where this increased load across the winglet may cause a shear load and bending moment in the wing.

Illustrative Flow Interrupter

FIG. 1 depicts an illustrative flow interrupter 100 which is attachable to a portion of a wingtip device 102 of an aircraft wing 104 of an aircraft (not shown). In one embodiment, the flow interrupter 100 may include a first edge 106 fixedly coupleable to a leading edge 108 of a wingtip device 102, and a second edge 110 comprising a flow disruptor 112 configured to alleviate a load on the wingtip device 102. The wingtip device 102 may include, but is not limited to, winglet, end-plate, spiroid, split winglet, fence, rake, swallow tail, or combinations thereof. The wingtip device 102 may have a substantially vertical portion 114. The leading edge 108 may be a portion or all of a leading edge of the vertical portion 114. The substantially vertical portion 114 may extend directly from the end of the wing 104 or from a wingtip extension (not shown). Additionally or alternatively, the wingtip device may have multiple vertical or moveable surfaces that may be substantially vertical in certain configurations. Additionally or alternatively, the substantially vertical portion 114 may extend above the wing 104, below the wing 104, or a combination there of. Additionally or alternatively, the substantially vertical portion 114 may be offset from the end of the wing 104, for example as part of an outer portion of a spiroid wingtip device. By way of example only, the leading edge 108 depicted in FIG. 1 is straight; however, the leading edge 108 may be curved, discontinuous, or otherwise shaped.

FIG. 1 also depicts, by way of example only, an illustrative cross-section 116 of the substantially vertical portion 114 and the flow interrupter 100. Also depicted in FIG. 1, by way of example only, is an illustrative cross-section 118 of the flow interrupter 100 separated from the substantially vertical portion 114.

Illustrative Aircraft with Flow Interrupters

FIG. 2 depicts an illustrative flow interrupter 200 which is attachable to a portion of a wingtip device 202 of an aircraft wing 204 of an aircraft 206. In one embodiment, the flow interrupter 200 may be fixedly coupleable to a leading edge 208 of a wingtip device 202 to alleviate a load on the wingtip device 202. The wingtip device 202 may have a substantially vertical portion 214. In various embodiments the aircraft 206 may have a primary flight control surface 210, for example and aileron, coupled to the wing 204. In various embodiments the wing 204 may be coupled to the aircraft fuselage 212. The aircraft may also have a vertical stabilizer 214 and may also have a rudder 216 coupled to the vertical stabilizer 214. Additionally or alternatively, the aircraft 206 may have multiple vertical stabilizers, a v-tail, or no vertical stabilizer at all.

Illustrative Flows Around an Aircraft with Flow Interrupters

Figure 3:
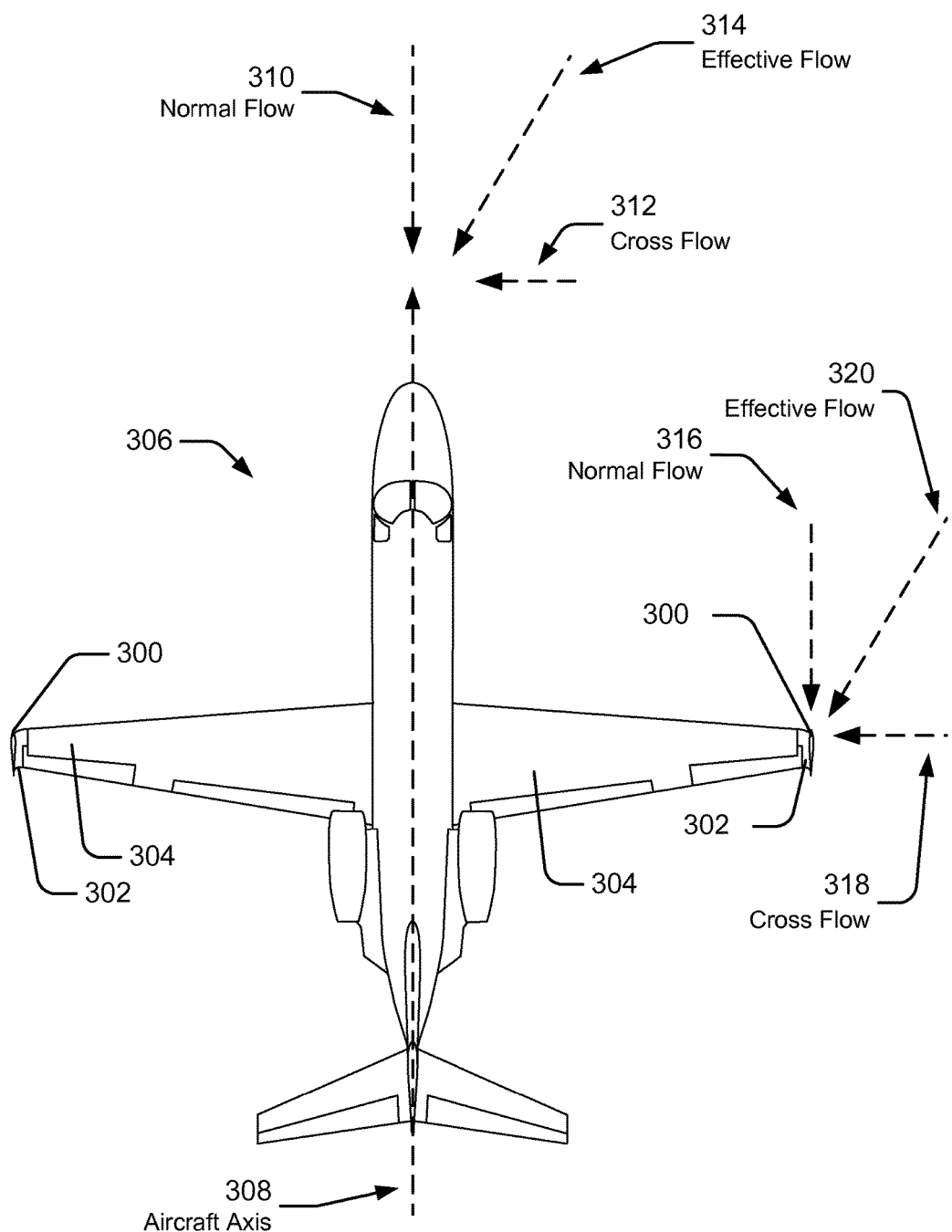
FIG. 3 depicts an aircraft with attached illustrative flow interrupters in an illustrative environment.

FIG. 3 depicts an illustrative flow interrupter 300 implemented on a wingtip device 302 attached to a wing 304 of an aircraft 306. By way of example only, and not limitation, FIG. 3 illustrates a flow interrupter 300 on each wingtip 302 of the aircraft 306. However, flow interrupter 300 may also be placed on other surfaces of the aircraft 306.

FIG. 3 also depicts arrows representative of aspects of an aircraft in various flight conditions. For example, arrow 308 represents an axis of the aircraft 306. In various embodiments arrow 308 may represent a principal axis of aircraft 306, for example a longitudinal axis. This longitudinal axis may also be substantially coplanar with a force vector that may represent thrust created by the aircraft 306.

FIG. 3 also depicts arrows 310, 312, and 314 as representative of various flows that the aircraft 306 may encounter in various flight conditions. For example, an aircraft may pass through a fluid, for example, air. By way of example and not limitation, arrow 310 may represent a vector of normal oncoming flow that the aircraft may encounter from normal flight. Additionally or alternatively, arrow 312 may represent a vector of a flow substantially perpendicular to the longitudinal axis of the aircraft, for example a cross flow and/or a transverse flow. In various embodiments the cross flow component may be caused by a wind gust or a maneuver, for example, a side slip maneuver. However, various other environmental factors or actions could cause, create, and/or induce a cross flow component. Additionally or alternatively, arrow 314 may represent a vector of an effective flow that is experienced by aircraft 306. By way of example and not limitation, arrow 314 may represent a flow that is a combination of any normal flow represented by arrow 310 and arrow 312. Additionally, the arrows depicted in the figures may or may not be drawn to scale in absolute or relative magnitude.

FIG. 3 also depicts arrows 316, 318, and 320 as representative of various flows that the flow interrupter 300 and wingtip device 302 of aircraft 306 may encounter in various flight conditions. By way of example and not limitation, arrows 316, 318, and 320 may represent analogous flows as arrows 310, 312, and 314 as discussed above respectively. However, as arrows 316, 318, and 320 may depict localized flows at the wingtip of wing 304, the wingtip device 302, and/or the flow interrupter 300. Localized flows may be affected by various flight conditions of the aircraft 306 as well as relative flows caused by pressure differentials between the upper and lower surfaces of the wing 304 during operation in the various flight conditions.

Illustrative Flows Around a Flow Interrupter

Figure 4:
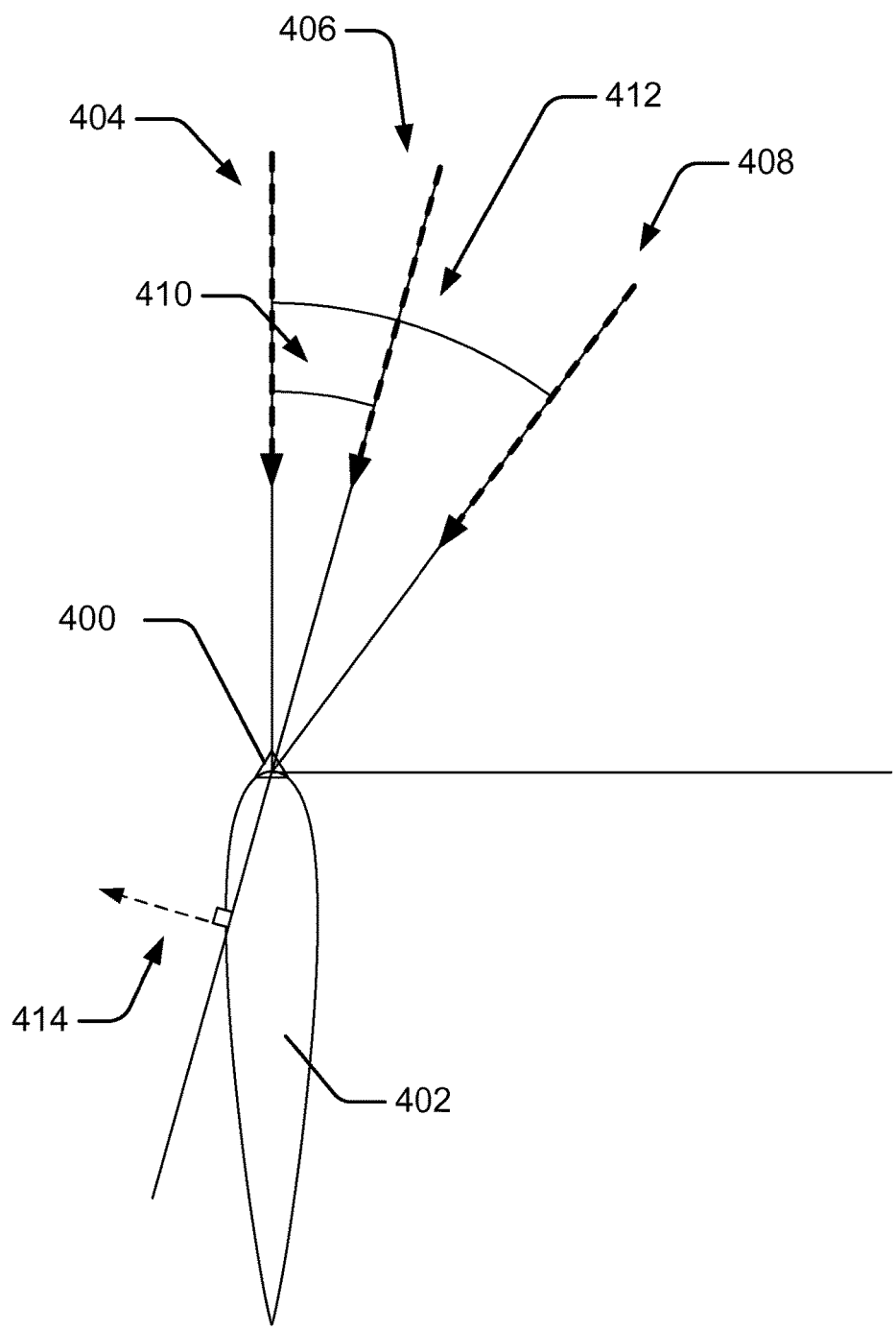
FIG. 4 depicts a cross-section view of an illustrative flow interrupter and wingtip device.

FIG. 4 depicts a cross-sectional view of an illustrative flow interrupter 400 implemented on a vertical portions of a wingtip device 402 attached to a wing of an aircraft (not pictured). In various embodiments, the flow interrupter 400 and wingtip device 402 may be similar to those described with respect to FIGS. 1-3. FIG. 4 also depicts arrows 404, 406, and 408 as representative of various flows that the aircraft may encounter in various flight conditions at angles of attack of zero, 410, and 412, respectively. For example, arrow 404 depicts a flow at a zero angle of attack with respect to the vertical portion of the wingtip device 402. By way of example only, an angle of attack of a wingtip device may be similar to an angle of attack of a wing, for example, a horizontal baseline wing of an aircraft. However, it is understood by one of ordinary skill in the art that an angle of attack of a baseline wing is often related to the pitch of the aircraft. Here, however, various embodiments contemplate that the angle of attack of the wingtip device may be related to the yaw of an aircraft. For example, various embodiments contemplate that the angle of attack on the wingtip device may be similar to an angle of attack experienced by a vertical stabilizer of an aircraft.

The angle of attack may be affected by various features of the aircraft configuration as well as the flight conditions. For example, the airflow at the wingtip may be influenced by factors including, but not limited to, the toe angle of the vertical portion of the wingtip device, which may be statically positioned as negative, positive, or neutral, as well as dynamically positioned negatively, positively, or neutrally, during various flight conditions. Additionally, or alternatively, the flight conditions may affect the airflow at the wingtip including the amount of lift generated by the wing at a various angles of attack and flight speeds as well as wing configurations including but not limited to deployment of flaps, spoilers, leading edge devices, controllable airflow modification devices, and/or combinations thereof.

Additionally or alternatively, determination of the local angle of attack at the wingtip device may be may be nuanced, where a simplified measurement of the angle of attack of the effective oncoming flow measured with respect to the fuselage may be referred to as a proxy for the actual angle experienced at the wingtip. The angle of attack at the fuselage may be used directly, with an offset, a simple calculation, a complex transformation, or a combination thereof. For simplification, the arrows depicted in FIG. 4 show a flow state where the toe angle is normalized out and the flow distortion caused by localized flow effects at the wingtip is disregarded.

FIG. 4 also depicts arrow 406 representative of a flow at a certain flight condition. Arrow 406 may be representative of a flow approaching the wingtip device 402 at an angle of attack 410 from a zero angle of attack as illustrated by arrow 404. Angle of attack 410 may be positive or negative with respect to the zero angle of attack. By way of example only, angle of attack 410 is shown in FIG. 4 as positive. Additionally or alternatively, oncoming flow at an angle of attack 410 may induce an aerodynamic force including lift and drag. By way of example only, a lifting force created by the flow is represented by arrow 414. Additionally or alternatively, the amount of lifting force is based at least in part on the shape, size, and configuration of the wing and wingtip device 402, the flight conditions including speed, altitude, weather conditions, angle of attack of the flow on the wingtip device, the type of flow including attached, detached, laminar, and/or turbulent, and or a combination thereof.

Illustrative Forces and Stress on an Aircraft with Flow Interrupters

Figure 5:
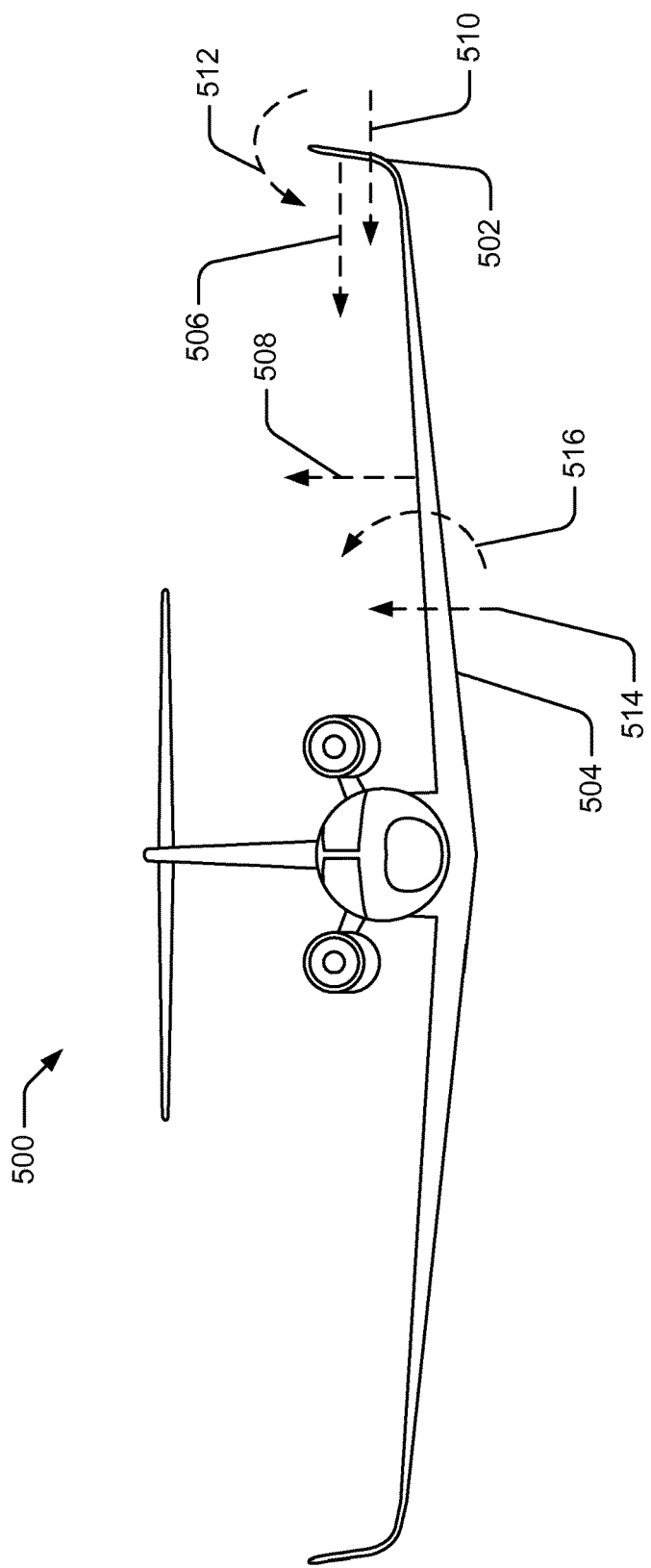
FIG. 5 depicts an aircraft with attached illustrative flow interrupters with illustrative loads and stresses.

FIG. 5 shows an illustrative aircraft 500 with a wingtip device 502 attached to a wing 504. FIG. 5 also depicts arrows illustrative of various simplified and representative forces experienced by aircraft 500 in various flight conditions. For example, arrow 506 is illustrative of a lifting force experienced by wingtip device 502 in various flight conditions. This lifting force 506 may be similar to the lifting force discussed with respect to FIG. 4. Additionally or alternatively, arrow 508 is illustrative of a lifting force experienced by wing 504 in various flight conditions. The lift forces represented by arrows 506 and 508 may cause internal stresses within the wing 504 and wingtip device 502. For example, arrow 510 is illustrative of a resulting shear force in the wingtip device 502 caused by the lift represented by arrow 506. Additionally or alternatively, arrow 512 represents a moment in the wingtip device 502 caused by the lift represented by arrow 506. Additionally or alternatively, arrow 514 is illustrative of a resulting shear force in the wing 504 caused by the lift represented by arrow 508 as well as the stress communicated to the wing 504 from the wingtip device 502. Additionally or alternatively, arrow 516 represents a moment in the wing 504 caused by the lift represented by arrow 508 as well as the stress communicated to the wing 504 from the wingtip device 502.

In various embodiments, the stresses illustrated in FIG. 5 may drive the design of the wing structure, which may often impact the overall weight and therefore efficiency of an aircraft. As such, selectively reducing certain forces at certain locations at certain flight conditions may reduce the resulting stresses and may reduce the overall weight of a structure, and may improve the efficiency of an aircraft.

Illustrative Differences from Conventional Stall Strips

Conventional stall strips are often used on aircraft to initiate a partial stall at a known location (often on an inboard portion of a horizontal wing) to notify a pilot that the aircraft is nearing stall or to correct for asymmetric stall between two wings of an aircraft. Examples of a notification of the stall often include shaking of the aircraft or flight controls caused by buffeting flow against the fuselage. This warning is designed to allow a pilot time to correct the flight of the aircraft to avoid an undesired stall. Often a small byproduct of this notification is loss of lift in the wing of the aircraft. Additionally, correcting for asymmetric stall between two wings often causes a limited amount of lift. For safety purposes related to control in a stall, wings stalling symmetrically is often beneficial and desired. As such, conventional stall strips are traditionally used for safety purposes and not for load alleviation.

Illustrative Flows Around Wingtip Devices and Flow Interrupters

FIGS. 6A-F depict cross-sectional views of illustrative vertical portions of a wingtip devices attached to a wing of an aircraft (not pictured). For example, FIGS. 6A-C show illustrative flow interrupter 600 attached to vertical portions of a wingtip device 602. Additionally, FIGS. 6D-F show illustrative vertical portions of a wingtip device 604 without a flow interrupter. In various embodiments, the flow interrupters 600 and wingtip devices 602 may be similar to those described with respect to FIGS. 1-5. FIGS. 6A-C also depict arrows 604, 606, and 608 as representative of various flows that the aircraft may encounter in various flight conditions at angles of attack of zero, 610, and 612, respectively; while FIGS. 6D-F depict arrows 614, 616, and 618 as representative of various flows that the aircraft may encounter in various flight conditions at angles of attack of zero, 620, and 622, respectively. As discussed above, the angle of attack may be affected by various features of the aircraft configuration as well as the flight conditions. Also, as discussed above, the arrows depicted in FIGS. 6A-F show a flow state where the toe angle is normalized out and the flow distortion caused by localized flow effects at the wingtip is disregarded.

By way of example only, lifting forces created by the flow based at least in part on the angle of attack are represented by arrows 624, 626, 628, 630, 632, and 634 in FIGS. 6A-F respectively. For example, the flow indicated by arrow 606 for a given flight condition may produce a lift force on the wingtip device 602 represented by arrow 626.

Additionally, or alternatively, FIGS. 6A-F show lines representative of select flow conditions over the wingtip devices 602 and 604. For example, FIGS. 6A-F show flow line 636, 638, 640, 642, 644, and 642 respectively.

In various embodiments, different types of flow may be represented by flow line 636, 638, 640, 642, 644, and 642. For discussion purposes only, the different types of flows may be reduced to attached and detached flows. However, it is understood by those skilled in the art that flows may be partially attached or partially detached along the surfaces in both the flowwise direction as well as along a spanwise direction.

FIG. 6A shows a flight condition where an incoming flow is approaching the wingtip device 602 at a low angle of attack, for example, near zero degrees as represented by arrow 604. This flow may cause a lift force to be generated on the wingtip device 602 as represented by arrow 624. The magnitude of arrow 624 is for illustrative purposes only. The lift generated may be positive, negative, or negligible, based at least in part on the flight conditions, the aircraft, and airfoil shaped used by the wingtip device 602. As depicted in FIG. 6A, the flow line 636 represents an attached flow across the wingtip device 602. Various embodiments contemplate that flow interrupter 600 is contained substantially within a stagnation zone forming near the leading edge of the wingtip device.

FIG. 6D shows a flight condition where an incoming flow is approaching the wingtip device 604 at a low angle of attack, for example, near zero degrees as represented by arrow 614. This flow may cause a lift force to be generated on the wingtip device 604 as represented by arrow 630. The magnitude of arrow 630 is for illustrative purposes only. The lift generated may be positive, negative, or negligible, based at least in part on the flight conditions, the aircraft, and airfoil shaped used by the wingtip device 604. As depicted in FIG. 6D, the flow line 642 represents an attached flow across the wingtip device 604.

FIG. 6B shows a flight condition where an incoming flow is approaching the wingtip device 602 at an angle of attack 610 that is greater than zero, for example between 2 and 10 degrees, between 3 and 7 degrees, and/or near 5 degrees as represented by arrow 606. Various embodiments contemplate that the flow may separate at or above a threshold angle of attack. For example, as depicted in FIG. 6B, the flow line 638 represents a separated flow across the wingtip device 602. Various embodiments contemplate that flow interrupter 600 is not substantially contained within a stagnation zone forming near the leading edge of the wingtip device. Various embodiments contemplate that the flow interrupter 600 substantially emerges from the stagnation zone and substantially interrupts the boundary layer on wingtip device 602. This interruption may cause the flow to separate or detach from the wingtip device 602. This flow may cause a lift force to be generated on the wingtip device 602 as represented by arrow 626, where the magnitude of arrow 626 is for illustrative purposes only. This effect may be similar to a wing stalling in flight under certain flight conditions.

The lift generated, as represented by arrow 626, may be based at least in part on the flight conditions, the aircraft, airfoil shaped used by the wingtip device 602, and the type of flow. For illustrative purposes only, as depicted in FIG. 6B, the flow interrupter 600 may interrupt the flow across the wingtip device 602 causing the flow to detach. This detached flow may reduce the amount of lift generated by the wingtip device 602 as compared to an amount of lift generated by an attached flow.

FIG. 6E shows a flight condition where an incoming flow is approaching the wingtip device 604, as represented by arrow 616, at an angle of attack 620 that may be similar to the angle of attack 610 of FIG. 6B. As depicted in FIG. 6E, the flow line 644 represents an attached flow across the wingtip device 604. This flow may cause a lift force to be generated on the wingtip device 604 as represented by arrow 632, where the magnitude of arrow 632 is for illustrative purposes only.

As discussed above, the attached flow as depicted in FIG. 6E may generate a larger lift force than the detached flow depicted in FIG. 6B. Various embodiments contemplate that the reduction in lifting force experienced at the flight conditions where the becomes detached may allow for a reduction in stresses experienced by the wingtip device and wing as discussed above, for example, with respect to FIG. 5.

FIG. 6C shows a flight condition where an incoming flow is approaching the wingtip device 602 at an angle of attack 612 that is greater than zero, for example between 10 and 18 degrees, between 12 and 16 degrees, and/or near 14 degrees as represented by arrow 606. As depicted in FIG. 6C, the flow line 640 represents a separated flow across the wingtip device 602. Various embodiments contemplate that flow interrupter 600 is not substantially contained within a stagnation zone forming near the leading edge of the wingtip device. Various embodiments contemplate that the flow interrupter 600 substantially emerges from the stagnation zone and substantially interrupts the boundary layer on wingtip device 602. This flow may cause a lift force to be generated on the wingtip device 602 as represented by arrow 628, where the magnitude of arrow 628 is for illustrative purposes only.

The lift generated, as represented by arrow 628, may be based at least in part on the flight conditions, the aircraft, airfoil shaped used by the wingtip device 602, and the type of flow. For illustrative purposes only, as depicted in FIG. 6C, the flow interrupter 600 may interrupt the flow across the wingtip device 602 causing the flow to be detached. This detached flow may reduce the amount of lift generated by the wingtip device 602 as compared to an amount of lift generated by an attached flow.

FIG. 6F shows a flight condition where an incoming flow is approaching the wingtip device 604, as represented by arrow 618, at an angle of attack 622 that may be similar to the angle of attack 612 of FIG. 6C. As depicted in FIG. 6F, the flow line 646 represents a separated flow across the wingtip device 604. This flow may cause a lift force to be generated on the wingtip device 604 as represented by arrow 634, where the magnitude of arrow 634 is for illustrative purposes only. For various aircraft with wingtip devices such as winglets, the flow may separate at approximately 14 degrees angle of attack. This separation may be caused by the flight conditions, aircraft, and/or airfoil used in the wingtip device. This effect may be similar to a wing stalling in flight during certain flight conditions.

Illustrative Flow Interrupters

Figure 7A:
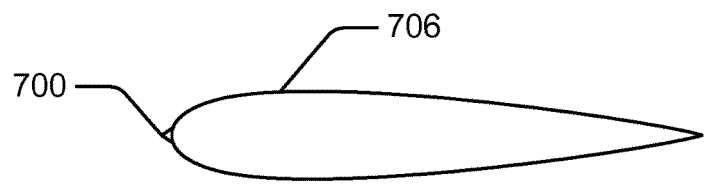
FIGS. 7A-E depict cross-sectional views illustrative flow interrupters with wingtip devices.
Figure 7B:
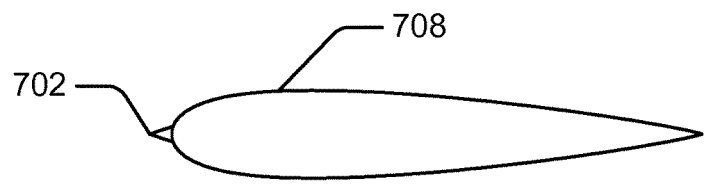
Figure 7C:
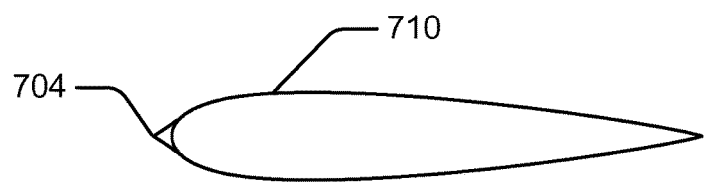

FIGS. 7A-E depict illustrative cross-section views of flow interrupters which may be attachable to or integrated into a portion of a wingtip device of an aircraft wing. For example, FIGS. 7A-C illustrate that flow interrupters 700, 702, and 704 may be configured to attach to wingtip devices 706, 708, and 710 respectively. Various embodiments contemplate that the flow interrupters may be attached to wingtip devices by an original manufacturer, a third party installer, an end-user, or a combination thereof. FIGS. 7A-C also illustrate various embodiments of flow interrupters 700, 702, and 704. For example, a flow interrupter 702 may be relatively longer than flow interrupter 700, but may substantially maintain a relative thickness ratio to a thickness of the wingtip device 706 and 708. Additionally or alternatively, a flow interrupter 704 may be relatively longer than flow interrupter 700, but may substantially maintain a relative shape and create a different thickness ratio to a thickness of the wingtip device 706 and 710. Additionally or alternatively, the flow interrupters 700, 702, and 704 may have various tip sharpness. For example, flow interrupter 702 may have a relatively sharper leading edge than flow interrupter 700 and 704. Various embodiments contemplate that a sharp edge of a flow interrupter may comprise a substantially small radius between two adjacent sides meeting. Additionally or alternatively, a sharp edge of a flow interrupter may comprise adjacent sides meeting at 90 degrees or less. Additionally or alternatively, a sharp edge of a flow interrupter may comprise adjacent sides meeting at 45 degrees or less. Additionally or alternatively, a sharp edge of a flow interrupter may comprise adjacent sides meeting at 30 degrees or less. Additionally or alternatively, a sharp edge of a flow interrupter may comprise adjacent sides meeting at 15 degrees or less.

Figure 7D:
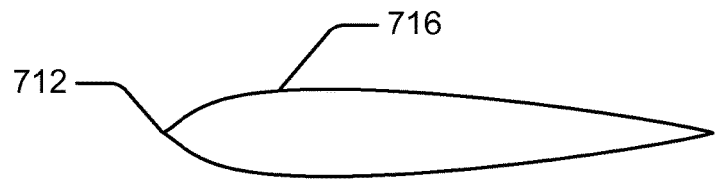
Figure 7E:
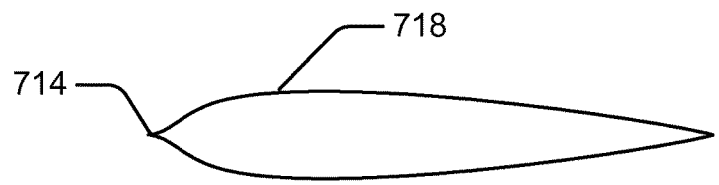

FIGS. 7D and 7E illustrate that flow interrupters 712 and 714 may be configured to be integrated into wingtip devices 716 and 718 respectively. For example, FIGS. 7D and 7E show substantially smooth transitions from the flow interrupters 712 and 714 to the wingtip devices 716 and 718 respectively. Additionally or alternatively, the transition may be substantially convex from the flow interrupter to the wingtip device, for example, as depicted in FIG. 7D. Additionally or alternatively, the transition may be substantially concave from the flow interrupter to the wingtip device, for example, as depicted in FIG. 7E.

Figure 8A:
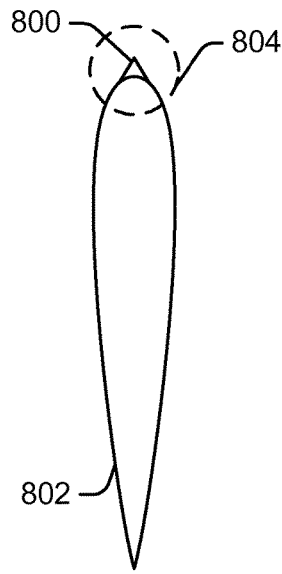
FIGS. 8A-P depict cross-sectional views of additional illustrative flow interrupters with wingtip devices.
Figure 8B:
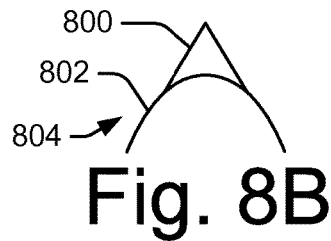
Figure 8C:
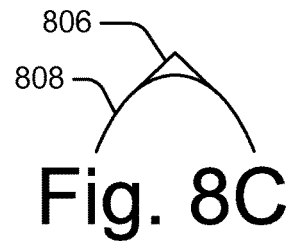
Figure 8D:
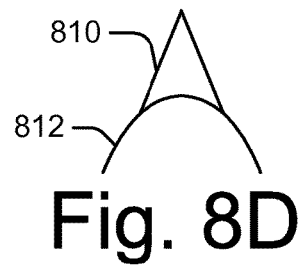
Figure 8E:
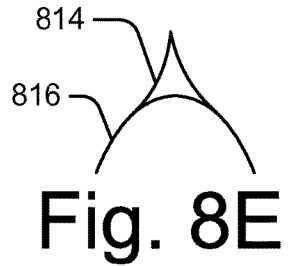
Figure 8F:
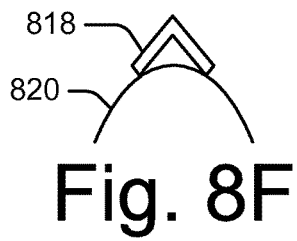
Figure 8G:
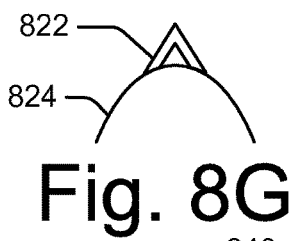
Figure 8H:
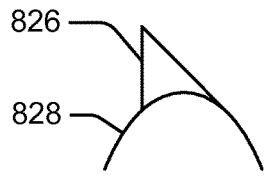
Figure 8I:
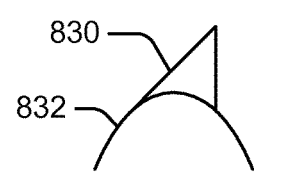
Figure 8J:
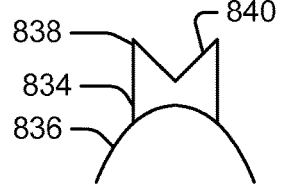
Figure 8K:
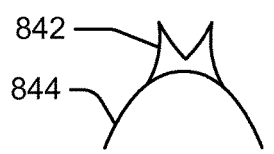
Figure 8L:
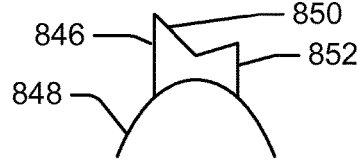
Figure 8M:
Figure 8N:
Figure 8O:
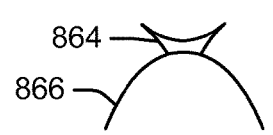
Figure 8P:
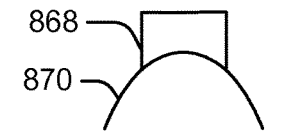

FIGS. 8A-P depict illustrative cross-section views of flow interrupters which may be attachable to or integrated into a portion of a wingtip device of an aircraft wing. For example, FIG. 8A depicts a flow interrupter 800 that is attachable to wingtip device 802. FIG. 8A also depicts an area 804 that is enlarged and shown in FIG. 8B. FIG. 8C shows an illustrative flow interrupter 806 coupled to wingtip device 808 where the flow interrupter 806 has a shorter length than flow interrupter 800 and has an effectively lower sharpness at a leading edge of the flow interrupter 806. FIG. 8D shows an illustrative flow interrupter 810 coupled to wingtip device 812 where the flow interrupter 810 has a longer length than flow interrupter 800 and has an effectively higher degree of sharpness at a leading edge of the flow interrupter 810. FIG. 8E shows an illustrative flow interrupter 814 coupled to wingtip device 816 where the flow interrupter 814 has relatively concave sides when compared to flow interrupter 800 and has an effectively higher degree of sharpness at a leading edge of the flow interrupter 814. FIG. 8F depicts an embodiment where flow interrupter 818 may create a substantially hollow region between an inner surface of flow interrupter 818 and wingtip device 812. Additionally or alternatively, FIG. 8E depicts another embodiment where interrupter 822 may create a substantially hollow region between an inner surface of flow interrupter 822 and wingtip device 824. Various embodiments contemplate that the hollow region may reduce overall weight of the added strip. Additionally or alternatively, the hollow region may allow other standardized material to be used in manufacturing the flow interrupter.

Additionally or alternatively, a flow interrupter may be configured to have a sharper edge with respect to one side than the other side. Various embodiments contemplate that flow conditions may differ from flow encountered when an angle of attack is positive and when the angle of attack is negative. For example, various embodiments contemplate that when an angle of attack is positive as discussed above, for example with respect to FIG. 3, stresses, for example, a shear force and moment are generated on the wing as described above, for example with respect to FIG. 5. Various embodiments contemplate that in the situation when the angle of attack is positive, the stresses may substantially be in the same direction as stresses in the wing generated by lift. The addition of these stresses may cause the wing structure to reach certain design criteria or limits. However, various embodiments contemplate that when an angle of attack is negative, the stresses may substantially be in the opposite direction as stresses in the wing generated by lift. The addition of these stresses may cancel out some of the stresses in the wing caused by lift and may provide a beneficial reduction in overall stresses in the wing structure.

Various embodiments contemplate this asymmetric nature and effect of the stresses resulting from either positive or negative angles of attack. For example, FIG. 8H shows an illustrative flow interrupter 826 coupled to wingtip device 828 where the flow interrupter 826 has a leading edge that is biased to one side. This may allow flow to separate at a higher angle of attack from one side and at a lower angle attack from the other side. For example, if flow is approaching from a positive angle of attack as discussed above, the leading edge of the flow interrupter 826 may emerge from the stagnation zone and cause flow detachment at a lower angle of attack than it would from a similar negative angle of attack. FIG. 8I shows an illustrative flow interrupter 830 coupled to wingtip device 832 where the flow interrupter 830 has a leading edge that is biased to one side. For example, if flow is approaching from a negative angle of attack as discussed above, the leading edge of the flow interrupter 830 may emerge from the stagnation zone and cause flow detachment at a lower angle of attack than it would from a similar positive angle of attack.

Additionally or alternatively, various embodiments contemplate that the flow interrupter may comprise multiple leading edges. For example, FIG. 8J depicts an illustrative flow interrupter 834 coupled to a wingtip device 832 where flow interrupter may comprise two or more leading edges 838 and 840. FIG. 8K depicts an embodiment where flow interrupter 842 is coupled to a wingtip device 844 where flow interrupter 842 comprises at least two leading edges where the flow interrupter 842 has relatively concave sides when compared to flow interrupter 834 and has an effectively higher degree of sharpness at a leading edges of the flow interrupter 842.

FIG. 8L depicts an embodiment where flow interrupter 846 is coupled to a wingtip device 848 where flow interrupter 846 comprises at least two leading edges 850 and 852. Various embodiments contemplate that the leading edges of the flow interrupter may be configured such that different leading edges have different configurations. For example, leading edge 850 may be relatively larger and or have a sharper edge when compared to leading edge 852. As discussed above, this may cause a separation of flow at a given angle of attack from one side, but not at the same angle of attack from the other side. FIG. 8M depicts an embodiment where flow interrupter 854 is coupled to a wingtip device 856 where flow interrupter 854 comprises at least two leading edges where the flow interrupter 854 has relatively concave sides when compared to flow interrupter 846 and has an effectively higher degree of sharpness at a leading edges of the flow interrupter 854.

Additionally or alternatively, various embodiments contemplate that there may be two or more flow interrupter coupled to the wingtip device. For example, flow interrupters 858 and 860 may be coupled to wingtip device 862. Flow interrupters 858 and 860 may be the same or substantially similar in shape and size, or they may be substantially different in size and shape. Additionally or alternatively, the flow interrupters may be located at corresponding or different locations on the leading edge of wingtip device 862.

Additionally or alternatively, various embodiments contemplate that the flow interrupter 864 attached to wingtip device 866 may have relatively aggressive concavity and/or relatively sharp leading edges. Additionally or alternatively, various embodiments contemplate that flow interrupter 868 may be coupled to wingtip device 870 where the flow interrupter may have substantially blunt leading edge with relatively rectangular edges. As noted above the flow interrupters depicted in FIGS. 8A-P are illustrative where features of each may be used in combination with other features of the flow interrupters.

Illustrative Flow Interrupter Configurations

FIGS. 9A-F depict illustrative views of flow interrupters which may be coupled to wingtip devices. For example, FIG. 9A depicts an illustrative flow interrupter 900 which is attachable to a portion of a wingtip device 902 of an aircraft wing (not shown) at an aircraft attachment region 904. Various embodiments contemplate that the flow interrupter 900 may cover a portion of or all of the leading edge 906 of the wingtip device 902. Additionally or alternatively, the wingtip device 902 may have a substantially vertical portion 908. Various embodiments contemplate that the vertical portion 908 may extend substantially above the wing, below the wing, or a combination thereof.

FIG. 9B depicts an illustrative flow interrupter 910 which is attachable to a portion of a wingtip device 912. Various embodiments contemplate that the flow interrupter 910 may couple to a portion of the leading edge 914 of the wingtip device 912. Additionally or alternatively, the portion of the leading edge 914 coupled to the flow interrupter 910 may be substantially closer to an end 916 of the wingtip device 912 that is distal to a region 918 of the wingtip device 912 that is attachable to a wing (not shown). By way of example only, the wingtip device 912 may comprise a winglet where the portion of the leading edge 914 coupled to the flow interrupter 910 may be substantially closer to a tip of the winglet that is distal to a root of the winglet that is attachable to a wing.

FIG. 9C depicts an illustrative flow interrupter 920 which is attachable to a portion of a wingtip device 922. Various embodiments contemplate that the flow interrupter 920 may couple to a portion of the leading edge 924 of the wingtip device 922. Additionally or alternatively, the portion of the leading edge 924 coupled to the flow interrupter 920 may be substantially distal to an end 926 of the wingtip device 922 and substantially closer to a region 928 of the wingtip device 922 that is attachable to a wing (not shown).

FIGS. 9D-F depict illustrative embodiments where the flow interrupter may be segmented along a leading edge of a wingtip device. For example, FIG. 9D depicts an illustrative flow interrupter 930 which is attachable to a portion of a wingtip device 932 of an aircraft wing (not shown) at an aircraft attachment region 934. Various embodiments contemplate that the flow interrupter 930 may cover a portion of or all of the leading edge 936 of the wingtip device 932. Various embodiments contemplate that the flow interrupter 930 may be comprised of segments along the leading edge 936. Various embodiments contemplate that the segments may be regularly or irregularly dispersed along the portion of the leading edge 936. Additionally or alternatively, the wingtip device 932 may have a substantially vertical portion 938. Various embodiments contemplate that the vertical portion 938 may extend substantially above the wing, below the wing, or a combination thereof.

FIG. 9E depicts an illustrative flow interrupter 940 which is attachable to a portion of a wingtip device 942. Various embodiments contemplate that the flow interrupter 940 may couple to a portion of the leading edge 944 of the wingtip device 942. Additionally or alternatively, the portion of the leading edge 944 coupled to the flow interrupter 940 may be substantially closer to an end 946 of the wingtip device 942 that is distal to a region 948 of the wingtip device 942 that is attachable to a wing (not shown). By way of example only, the wingtip device 942 may comprise a winglet where the portion of the leading edge 944 coupled to the flow interrupter 940 may be substantially closer to a tip of the winglet that is distal to a root of the winglet that is attachable to a wing. Various embodiments contemplate that the flow interrupter 940 may be comprised of segments along the leading edge 944. Various embodiments contemplate that the segments may be regularly or irregularly dispersed along the portion of the leading edge 944.

FIG. 9F depicts an illustrative flow interrupter 950 which is attachable to a portion of a wingtip device 952. Various embodiments contemplate that the flow interrupter 950 may couple to a portion of the leading edge 954 of the wingtip device 952. Additionally or alternatively, the portion of the leading edge 954 coupled to the flow interrupter 950 may be substantially distal to an end 956 of the wingtip device 952 and substantially closer to a region 958 of the wingtip device 952 that is attachable to a wing (not shown). Various embodiments contemplate that the flow interrupter 950 may be comprised of segments along the leading edge 954. Various embodiments contemplate that the segments may be regularly or irregularly dispersed along the portion of the leading edge 954.

Additionally or alternatively, various embodiments contemplate that the shape and profile of the flow interrupter may vary along the portion of the leading edge. For example, a flow interrupter may have a profile with a longer, sharper feature that disrupts a boundary layer at a threshold angle of attack at the tip away from a region that attaches to a wing than a profile closer to the region that attaches to the wing.

Illustrative Methods

Figure 10:
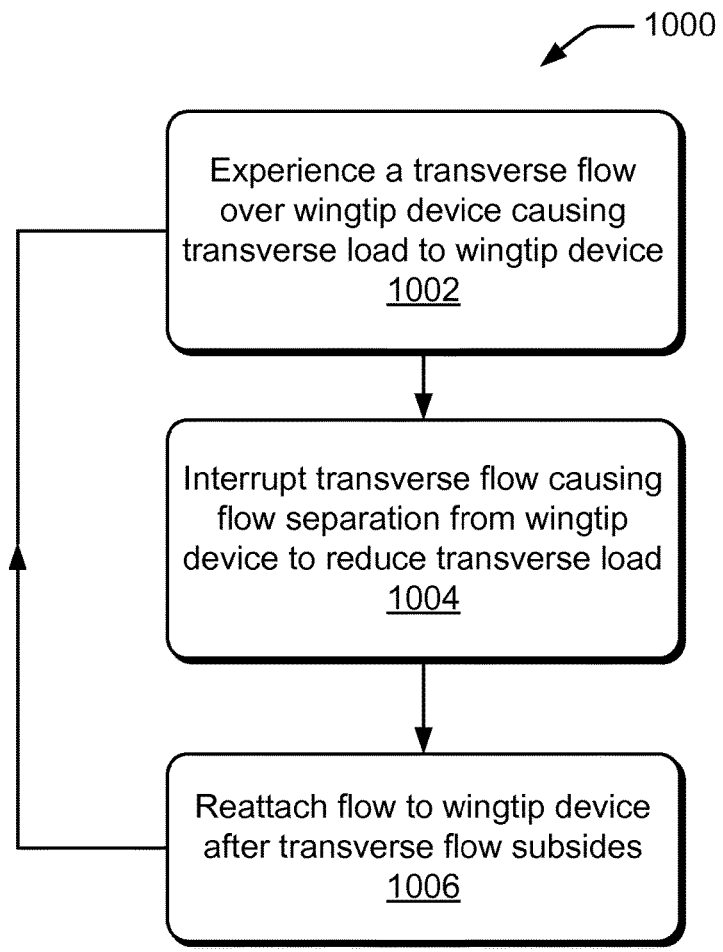
FIG. 10 depicts a flowchart illustrating operation of flow interrupting devices.

FIG. 10 is a flowchart of one illustrative method 1000 of operating flow interrupting devices. For ease of understanding, the method 1000 is described in the context of the configuration shown in FIGS. 4 and 6A-C. However, the method 1000 is not limited to performance using such a configuration and may be applicable to other aircraft and other types of wingtip devices.

In this particular implementation, the method 1000 begins at block 1002 where an aircraft may experience a transverse flow over wingtip device causing transverse load to the wingtip device. Various embodiments contemplate that the transverse flow component may combine with an oncoming normal flow component to generate an effective flow that may engage a wingtip device at an angle of attack.

At block 1004 the transverse flow may be interrupted causing flow separation from wingtip device to reduce a transverse load. Various embodiments contemplate that the transverse flow may be interrupted by interrupting the effective flow when, for example, the effective flow engages the wingtip device at an angle of attack greater than a threshold angle of attack. Additionally or alternatively, the separated flow may reduce a lifting force exerted by the flow on the wingtip device to a level below the lifting force that would be exerted by the flow if the flow were attached to the wingtip device.

At block 1006 the flow may be reattached to wingtip device after transverse flow subsides. Additionally or alternatively, the flow may reattach at a point where the transverse flow may still be greater than zero; however, the transverse flow may be low enough such that the effective flow may engage the wingtip device at an angle of attack below a threshold angle of attack.

Various embodiments contemplate that the method may be repeated as transverse flows are encountered and exited.

Illustrative Coefficients of Lift

Figure 11:
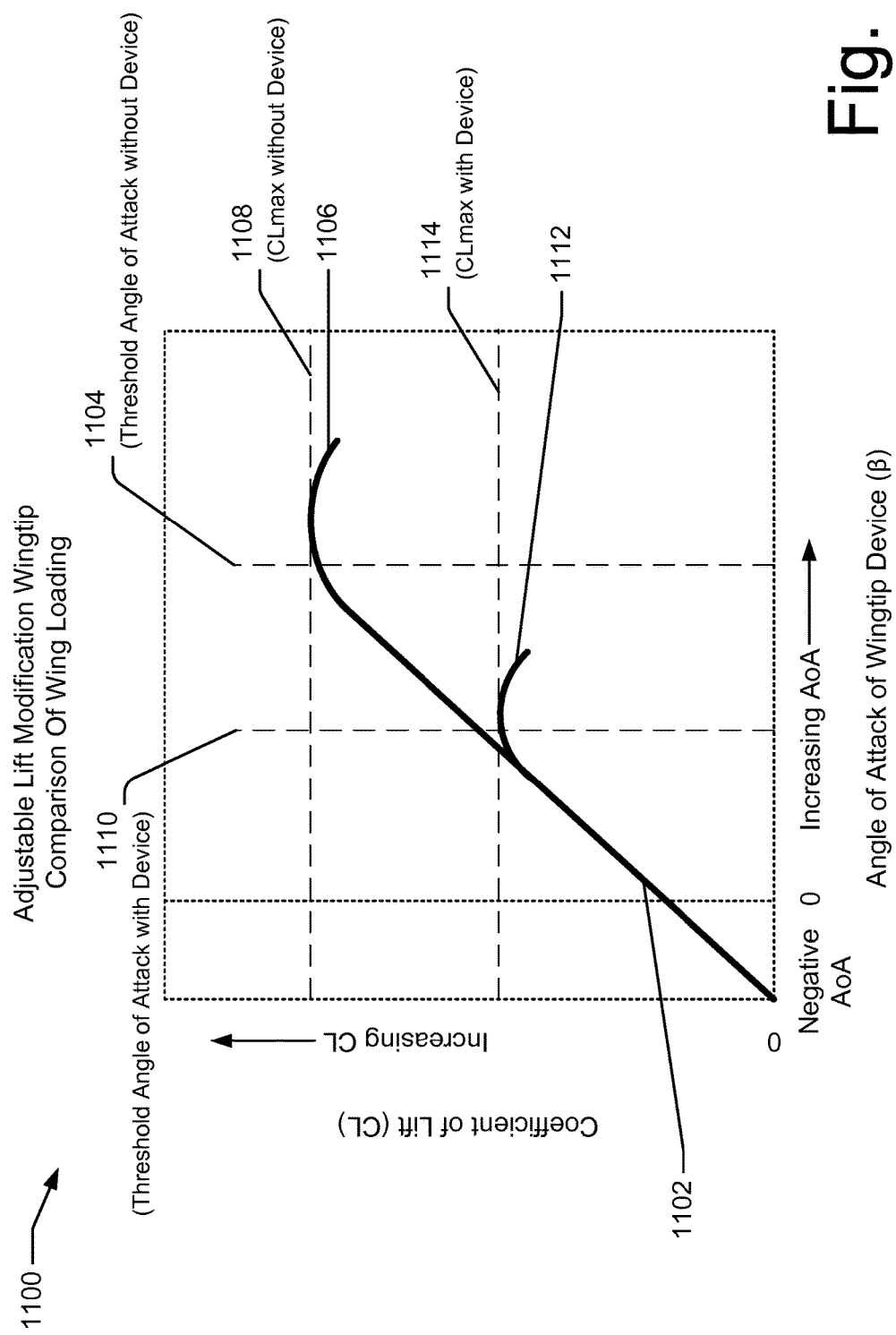
FIG. 11 depicts an illustrative plot of lift coefficients of illustrative flow interrupting devices compared to wingtip devices without said devices.

FIG. 11 depicts an illustrative example of a plot 1100 of a coefficient of lift of two wingtip devices, for example winglets, verses the angle of attack ($\beta$) for the wingtip devices. For example, line 1102 shows an illustrative slope of the CL as a function of $\beta$ for a wingtip device of a given configuration. Various embodiments contemplate that a given configuration may have a given airfoil, planform, sweep, toe angle, among other features. A wingtip device of a given configuration without a boundary layer interrupting device may reach a threshold $\beta$ 1104 when the angle of attack has increased to the point where the lift generated by the wingtip device begins to diminish and then drop as line 1106 depicts. The wingtip device may experience a $CL_{max}$ 1108 before the flow separates from the wingtip device.

FIG. 11 also depicts the line 1102 illustrative slope of the CL as a function of $\beta$ for a wingtip device of a given configuration with a boundary layer interrupting device. Various embodiments contemplate that the given configuration may be substantially the same for the wingtip device with a boundary layer interrupting device and the wingtip device without a boundary layer interrupting device, with the exception of the boundary layer interrupting device itself. Various embodiments contemplate that the boundary layer interrupting device may cause a wingtip device of a given configuration with a boundary layer interrupting device may reach a threshold $\beta$ 1110 when the angle of attack has increased to the point where the lift generated by the wingtip device begins to diminish and then drop as line 1112 depicts. The wingtip device may experience a $CL_{max}$ 1114 before the flow separates from the wingtip device.

By way of example only, various embodiments contemplate that the wingtip device with a boundary layer interrupting device, for example, the flow interrupter 100, may reach the threshold angle of attack at a CL of 50% of a wingtip device without a boundary layer interrupting device. Additionally or alternatively, by way of example only, various embodiments contemplate that the wingtip device with a boundary layer interrupting device may reach the threshold angle of attack at a CL between 25% and 75% of a wingtip device without a boundary layer interrupting device. Additionally or alternatively, by way of example only, various embodiments contemplate that the wingtip device with a boundary layer interrupting device may reach the threshold angle of attack at a CL between 10% and 60% of a wingtip device without a boundary layer interrupting device.

One of the possible benefits, as discussed, for example, with respect to FIG. 5, may be the reduction in lift on the wingtip device with the boundary layer interrupting device. For example, Lift is often defined L=q*S*CL where q is the dynamic pressure experienced by the wingtip device, S is the area of the wingtip device, and CL is the coefficient of lift of the wingtip device. Various embodiments contemplate that the force, for example lift, on a wingtip device may be reduced by limiting the CL experienced by the wingtip device. For example, $L=q*S*CL_{max}$. Various embodiments contemplate that if the $CL_{max}$ is reduced by the wingtip device with the flow interrupting device, then the resulting force from lift is likewise reduced. For example, a wingtip device without a boundary layer interrupting device may experience a higher lift force at an angle of attack $\beta$ when $\beta$ exceeds the threshold angle of attack 1110 than a wingtip device with a boundary layer interrupting device.

CONCLUSION

Although embodiments have been described in language specific to structural features and/or methodological acts, it is to be understood that the disclosure and appended claims are not necessarily limited to the specific features or acts described. Rather, the specific features and acts are disclosed as illustrative forms of implementing the embodiments. For example, the methodological acts need not be performed in the order or combinations described herein, and may be performed in any combination of one or more acts. Additionally or alternatively, the structural features and/or operation thereof may be used as described or in conjunction with all, or portions, or other structural features and/or operation thereof discussed elsewhere in the disclosure.

What is claimed is:

1. A boundary layer interrupting device comprising:
a first edge fixedly coupleable to a leading edge of a wingtip device, the wingtip device comprising a wingtip device airfoil and a wingtip device chord, the wingtip device airfoil substantially out of plane of a wing airfoil and a wing chord, the wingtip device airfoil extending substantially perpendicular with respect to the plane of the wing airfoil and the wing chord; and
a second edge comprising a flow disruptor configured to alleviate a load on the wingtip device, the flow disruptor comprising a disrupting edge that extends into and is contained within a stagnation region of the wingtip device at a first angle of attack of the wingtip device and protrudes from the stagnation region at a second angle of attack of the wingtip device.

2. The device of claim 1, wherein the flow disruptor comprises a sharp edge extending into a stagnation region of the wingtip device at a first angle of attack of the wingtip device and protrudes from the stagnation region at a second angle of attack of the wingtip device.

3. The device of claim 1, wherein the disrupting edge extends from the stagnation region of the wingtip device at a threshold angle of attack.

4. The device of claim 3, wherein the disrupting edge comprises an edge with a small effective radius in comparison to at least one of a length of the boundary layer interrupting device, a width of the boundary layer interrupting device, or a height of the boundary layer interrupting device.

5. The device of claim 1, wherein the wingtip device is a winglet, a spiroid, a split winglet, a fence, an endplate, or a combination thereof.

6. The device of claim 1, wherein the flow disruptor is configured to cause a flow to separate from the wingtip device when the flow is beyond a threshold angle of attack.

7. The device of claim 6, wherein the threshold angle of attack is less than ten degrees.

8. The device of claim 6, wherein the threshold angle of attack is less than five degrees.

9. A boundary layer interrupting device comprising:
a first edge fixedly coupleable to a leading edge of a wingtip device, the wingtip device comprising a wingtip device airfoil and a wingtip device chord, the wingtip device airfoil substantially out of plane of a wing airfoil and a wing chord, the wingtip device is disposed at the end of a wing; and
a second edge comprising a flow disruptor configured to alleviate a load on the wingtip device, the flow disruptor comprising a disrupting edge that extends into and is contained within a stagnation region of the wingtip device at a first angle of attack of the wingtip device and protrudes from the stagnation region at a second angle of attack of the wingtip device.

10. The device of claim 9, wherein the flow disruptor comprises a sharp edge extending into a stagnation region of the wingtip device at a first angle of attack of the wingtip device and protrudes from the stagnation region at a second angle of attack of the wingtip device.

11. The device of claim 9, wherein the disrupting edge extends from the stagnation region of the wingtip device at a threshold angle of attack.

12. The device of claim 11, wherein the disrupting edge comprises an edge with a small effective radius in comparison to at least one of a length of the boundary layer interrupting device, a width of the boundary layer interrupting device, or a height of the boundary layer interrupting device.

13. The device of claim 9, wherein the wingtip device is a winglet, a spiroid, a split winglet, a fence, an endplate, or a combination thereof.

14. The device of claim 9, wherein the wingtip device has a substantially vertical portion comprising the leading edge.

15. The device of claim 9, wherein the flow disruptor is configured to cause a flow to separate from the wingtip device when the flow is beyond a threshold angle of attack.

16. The device of claim 15, wherein the threshold angle of attack is less than ten degrees.

17. The device of claim 15, wherein the threshold angle of attack is less than five degrees.

18. A winglet comprising:
a substantially vertical portion comprising a leading edge; and
a boundary layer interrupting device coupled to a portion of the leading edge, the boundary interrupting device comprising:
a first edge fixedly coupleable to a leading edge of a wingtip device, the wingtip device comprising a wingtip device airfoil and a wingtip device chord, the wingtip device airfoil substantially out of plane of a wing airfoil and a wing chord, the wingtip device is disposed at the end of a wing; and
a second edge comprising a flow disruptor configured to alleviate a load on the wingtip device, the flow disruptor comprising a disrupting edge that extends into and is contained within a stagnation region of the wingtip device at a first angle of attack of the wingtip device and protrudes from the stagnation region at a second angle of attack of the wingtip device.

19. The device of claim 18, wherein the disrupting edge comprises an edge with a small effective radius in comparison to at least one of a length of the boundary layer interrupting device, a width of the boundary layer interrupting device, or a height of the boundary layer interrupting device.

* * * * *